UNITED STATES PATENT OFFICE.

ALBERT BETTELEY, OF BOSTON, MASSACHUSETTS.

IMPROVEMENT IN PREPARING PEAT FOR FUEL.

Specification forming part of Letters Patent No. 49,218, dated August 8, 1865.

*To all whom it may concern:*

Be it known that I, ALBERT BETTELEY, of Boston, in the county of Suffolk and State of Massachusetts, have invented a new and useful Improvement in the Preparation of Peat for Fuel; and I do hereby declare that the following, taken in connection with the drawings which accompany and form part of this specification, is a description of my invention sufficient to enable those skilled in the art to practice it.

In preparing peat for fuel by manufacturing it or by manipulating it so that the resultant is close-grained and hard and of a specific gravity approximating to that of anthracite coal the great difficulty hitherto encountered has been the getting rid of the water with which the natural peat is permeated. To evaporate the water by artificial heat, though practicable, is not practical on account of the expense involved. To get rid of the water by atmospheric exposure takes too much time, and unless great expense is incurred in roofing, the results are uncertain and dependent upon the weather, and these objections have hitherto prevented the successful practical production on an extensive scale of dense manufactured peat. Peat merely taken from the bog and sun-dried is too bulky and too friable to ever become an important article of commerce.

In the production of manufactured peat for fuel, or peat so treated as when dry to be hard and dense, it has been found that the water at first contained in the crude peat cannot be separated from the solid and valuable matter by straining on account of the loss of a very large portion of the solid material, which, owing to its extreme fineness or minute subdivision, passes off with the water.

By my invention these difficulties are overcome, and in practicing it I proceed as follows:

A series of large and high tanks is provided near a peat-bog. If the peat is, as it is most often found, mingled with roots and other undecomposed vegetable matter and stones, I prefer to remove such matter from the decomposed vegetation by a raking or straining process, or if there are no large roots, sticks, or stones, the crude peat may be triturated or rudely ground, the effect of either process being to break up the cellular structure of the peat so as to set free the water therein, making a semi-fluid or pasty mass. But if the peat is found free from undecomposed vegetable matter, then this preparatory process is not needed and the peat is conveyed into the tanks directly from the bog in this case, or in the other directly from the preparatory mechanism such as is described in the United States Patent No. 44,062, dated September 6, 1864, the same being the invention of E. H. Ashcroft and myself jointly. The tanks being open at the top, but closed water-tight elsewhere, are filled one after another as fast as may be, each tank being made preferably large enough to contain all the peat which can be taken in one day, in proper condition, by one set or gang of men, from the bog. Each tank is then left long enough undisturbed to allow the solid matter therein to separate from the fluid by precipitation. As fast as the water at the top of the tank becomes clear it can be displaced and caused to overflow by the introduction of matter from the bog, the filling-pipe discharging downward and having its outlet considerably below the top of the tank; or the water at the tank-top can be pumped out or drawn off by a siphon or faucets.

From a trap-door or man-hole, or large valve-closed opening at or near the bottom of the tank, the deposit of the solid matter can be removed or drawn off, and then by exposure to the atmosphere and sunlight, or by the application of artificial heat, the moisture remaining in this deposited peat can be expelled and the manufactured article is ready for market and use.

By the employment of the tank, as described, it will be obvious that a large portion of the water contained in crude peat can be got rid of in the production of manufactured peat at a cost little exceeding the interest and repairs on, and the depreciation of, the tanks.

I claim—

The employment of a tank in the preparation of peat for fuel, substantially as described.

In witness whereof I have hereunto set my hand this 15th day of July, A. D. 1865.

ALBERT BETTELEY.

Witnesses:
ALBERT C. BETTELEY,
J. B. CROSBY.